United States Patent
Mayer et al.

(10) Patent No.: US 10,260,908 B2
(45) Date of Patent: Apr. 16, 2019

(54) POSITION MEASURING DEVICE AND METHOD FOR OPERATING A POSITION MEASURING DEVICE

(71) Applicant: DR. JOHANNES HEIDENHAIN GmbH, Traunreut (DE)

(72) Inventors: Elmar Mayer, Nußdorf (DE); Andre Wiegand, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 134 days.

(21) Appl. No.: 15/667,539

(22) Filed: Aug. 2, 2017

(65) Prior Publication Data
US 2018/0038715 A1 Feb. 8, 2018

(30) Foreign Application Priority Data
Aug. 4, 2016 (DE) .......................... 10 2016 214 456

(51) Int. Cl.
*G01D 5/347* (2006.01)
*G01D 5/245* (2006.01)
(Continued)

(52) U.S. Cl.
CPC ............. *G01D 5/2457* (2013.01); *G01D 3/08* (2013.01); *G01D 5/24471* (2013.01);
(Continued)

(58) Field of Classification Search
CPC .................................................... G01D 5/2457
(Continued)

(56) References Cited

U.S. PATENT DOCUMENTS 4,628,609 A * 12/1986 Rieder ..................... G01B 7/02
250/237 G
2002/0002441 A1 * 1/2002 Hagl .................... G01D 5/2457
702/150
(Continued)

FOREIGN PATENT DOCUMENTS

DE 19521252 12/1996
DE 102006007871 A1 9/2006
(Continued)

OTHER PUBLICATIONS

European Search Report dated Dec. 19, 2017, in EP Application No. 17169506.

*Primary Examiner* — George B Bennett
(74) *Attorney, Agent, or Firm* — Hunton Andrews Kurth LLP

(57) ABSTRACT

A position measuring device includes: a first graduation carrier having a measuring graduation; a scanning unit, which is arranged so as to allow movement in a measuring direction relative to the measuring graduation in order to generate position-dependent scanning signals by scanning the measuring graduation; a signal processing unit for processing the scanning signals into positional signals; and a signal interface via which the positional signals are able to be output to subsequent electronics. At least one correction unit is provided in the signal processing unit by which at least one signal error of at least one scanning signal is able to be corrected. A monitoring unit is arranged to detect the reaching of a limit value of the signal error, and a correction unit triggering the event is able to be deactivated subsequently.

11 Claims, 3 Drawing Sheets

(51) Int. Cl.
  *G01D 3/08* (2006.01)
  *G08C 15/06* (2006.01)
  *G01D 5/244* (2006.01)
(52) U.S. Cl.
  CPC ......... *G08C 15/06* (2013.01); *G01D 5/24428* (2013.01); *G01D 5/24476* (2013.01)
(58) Field of Classification Search
  USPC .......................................... 33/706, 707, 708
  See application file for complete search history.

(56) References Cited

U.S. PATENT DOCUMENTS

| | | | | |
|---|---|---|---|---|
| 2003/0145479 A1* | 8/2003 | Mayer | ................ | G01D 5/24461 33/707 |
| 2005/0078015 A1* | 4/2005 | Ferran | ................ | G01D 5/2457 341/11 |
| 2009/0326860 A1 | 12/2009 | Hainz et al. | | |
| 2011/0209351 A1 | 1/2011 | Bohm | | |
| 2011/0144940 A1 | 6/2011 | Zachow et al. | | |
| 2011/0261422 A1* | 10/2011 | Braasch | ................ | G01D 5/2454 358/488 |
| 2013/0030756 A1 | 1/2013 | Bielski et al. | | |
| 2015/0330813 A1* | 11/2015 | Schlichtner | .......... | G01D 5/2457 33/707 |
| 2017/0030743 A1* | 2/2017 | Mayer | ....................... | G01D 5/26 |
| 2018/0031594 A1* | 2/2018 | Joseph | .................. | F02D 41/009 |
| 2018/0087930 A1* | 3/2018 | Motz | .................. | G01R 31/2884 |
| 2018/0313671 A1* | 11/2018 | Niiya | ................ | G01D 5/34792 |

FOREIGN PATENT DOCUMENTS

| | | |
|---|---|---|
| DE | 102009024020 A1 | 1/2010 |
| DE | 102008049140 A1 | 4/2010 |
| DE | 102011079961 A1 | 1/2013 |

* cited by examiner

POSITION MEASURING DEVICE AND METHOD FOR OPERATING A POSITION MEASURING DEVICE

CROSS-REFERENCE TO RELATED APPLICATIONS

The present application claims priority to Application No. 10 2016 214 456.1, filed in the Federal Republic of Germany on Aug. 4, 2016, which is expressly incorporated herein in its entirety by reference thereto.

FIELD OF THE INVENTION

The present invention relates to a position measuring device and to a method for operating a position measuring device.

BACKGROUND INFORMATION

Incremental position measuring devices are used in the field of automated manufacturing technology, and in particular in machine tools, for the purpose of measuring changes in the positions of movable parts. For example, incremental rotary encoders measure rotatory movements of rotating shafts. Incremental linear encoders, on the other hand, measure linear displacements of machine components that are situated so as to allow these components to move relative to one another.

In conventional incremental position measuring devices, a detector unit scans a scale division track that includes evenly placed code elements. A wide variety of physical scanning principles may be used for this purpose, such as optical, magnetic, inductive, or capacitive principles. Preferably, the detector signals resulting from the scanning are largely sinusoidal at a uniform movement (constant speed or constant rate of rotation); the positional information is able to be obtained by counting the cycled-through signal periods, for example, or if greater resolution is demanded, also by subdividing the signal periods into a number of linear or angle segments (interpolation). An item of directional information may be obtained if two detector signals that feature a phase shift from each other, e.g., a 90° phase shift, are generated during the scanning. Often, a reference pulse is generated at at least one position in order to produce an absolute reference point for the—design-related—relative—relative position measurement of incremental position measuring devices. A suitable graduation structure, which is likewise scanned by the detector unit, may be arranged on a separate scale division track for this purpose.

The detector signals obtained by the detector unit are processed in a signal processing unit and adapted in accordance with a specification of an output interface. For example, certain interfaces for incremental position measuring devices demand a peak-to-peak value of 1V for the incremental signals. The signals are largely sinusoidal at a constant movement speed (rate of rotation) and have a symmetrical characteristic around a reference potential (frequently the ground potential 0V). The phase shift between the incremental positional signals is 90°. Reference pulse R1 is symmetrical, and its maximum is at a defined position in relation to the incremental positional signals.

The signal processing unit is able to compensate for age-related changes in the detector signals obtained by the detector unit, such as a reduction in the signal amplitudes, within broad limits. A disadvantage of this procedure is that once the control limits of the signal processing unit have been reached, only a brief lead time remains until the position measuring device must be serviced or exchanged. In addition, the optimization of the detector signals by the signal processing unit makes it more difficult to adjust the detector unit relative to the measuring graduation inasmuch as optimal positional signals are already obtainable even after a still imprecise installation of detector signals heavily infected with errors.

German Published Patent Application No. 195 21 252 describes a position measuring device in which one or more output(s) of an output amplifier is/are able to be switched to high resistance in case of an interruption. However, this leads to an immediate emergency stop of the system so that there is no possibility for a preventive warning.

SUMMARY

Example embodiments of the present invention provide an improved position measuring device that allows for an early signaling of signal errors.

According to an example embodiment of the present invention, a position measuring device includes a graduation carrier having a measuring graduation and a scanning unit disposed so as to allow movement in a measuring direction relative to the measuring graduation in order to generate position-dependent scanning signal by scanning the measuring graduation. The position measuring device also has a signal processing unit for processing the scanning signals into positional signals, and a signal interface via which the positional signals are able to be output to subsequent electronics. At least one correction unit is provided in the signal processing unit, by which at least one signal error of at least one scanning signal is able to be corrected, as well as a monitoring unit with which it is possible to detect when a limit value of the signal error has been reached, and at least the particular correction unit triggering the event is subsequently able to be deactivated.

Example embodiments of the present invention provide a method by which signal errors of a position measuring device are signaled in a timely manner.

According to an example embodiment of the present invention, a method is provided for operating a position measuring device, the position measuring device including: a graduation carrier having a measuring graduation, a scanning unit, which is arranged so as to allow movement in a measuring direction relative to the measuring graduation and which generates position-dependent scanning signals by scanning the measuring graduation; a signal processing unit in which scanning signals are processed into positional signals; and a signal interface via which the positional signals are output to a subsequent electronics. At least one correction unit, with the aid of which at least one signal error of at least one scanning signal is corrected, is arranged in the signal processing unit. A monitoring unit detects when a limit value of the signal error is reached and subsequently deactivates at least the particular correction unit that is triggering the event.

Further features and aspects of example embodiments of the present invention are described in more detail below with reference to the appended Figures.

DETAILED DESCRIPTION

Figure 1:
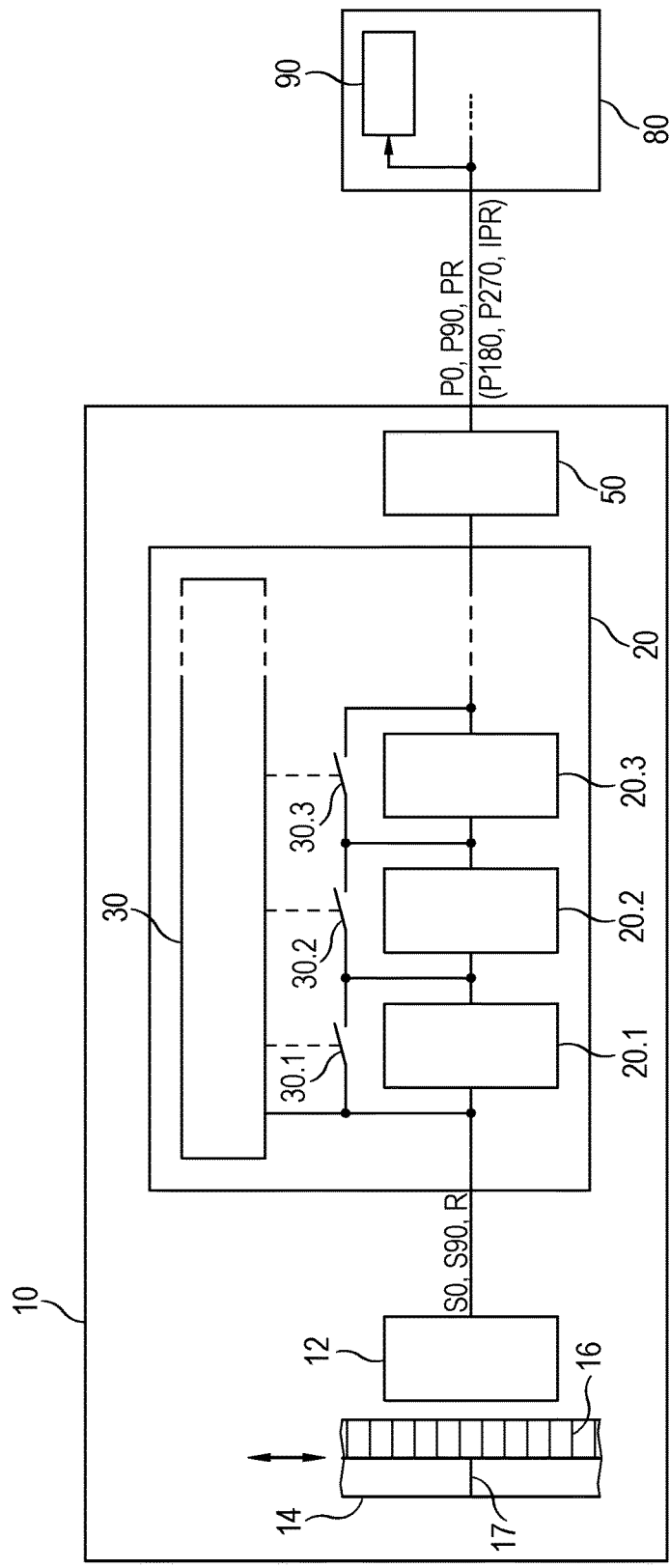
FIG. 1 schematically illustrates a position measuring device according to an example embodiment of the present invention.

FIG. 1 is a schematic block diagram of a position measuring device 10 according to an example embodiment of the present invention. The position measuring device 10 includes a scanning unit 12, which is arranged to scan a measuring graduation on a graduation carrier 14. In, a conventional manner, for example, graduation carrier 14 and scanning unit 12 are disposed so as to allow them to move relative to each other in a measuring direction, for instance, by being connected to movable parts of a machine tool whose relative position with respect to each other is to be determined.

Both linear (linear encoders) and rotatory position measuring devices (rotary encoders or angle measuring devices) may be provided according to example embodiments of the present invention, and example embodiments of the present invention may utilize a variety of physical scanning principles. For example, optical, magnetic, capacitive, and/or inductive scanning may be used.

In the example illustrated, the measuring graduation includes an incremental graduation track 16 and a reference graduation track 17. The scanning of measuring graduation 16, 17 produces scanning signals S0, S90, R that include two incremental signals S0, S90, phase-shifted by 90°, from the scanning of incremental graduation track 16 and also a reference signal R from the scanning of reference graduation track 17. Depending on the scanning principle, preprocessing of detector signals such as a conversion from current into voltage signals may take place in scanning unit 12 in order to generate scanning signals S0, S90, R.

Given a uniform movement (corresponding to a constant speed) of the measuring graduation in relation to scanning unit 12, incremental signals S0, S90 are substantially sinusoidal. Reference signal R is intended to supply an absolute reference position for the—configuration-related—relative position measurement of incremental position measuring device 10. For this purpose, reference signal R includes a pulse, which is referred to as a reference pulse, at at least one defined position (or in the case of an angle measuring device, at a defined angular position).

Scanning signals S0, S90, R are supplied to a signal processing unit 20, which processes them into positional signals P0, P90, PR. To do so, signal processing unit 20 includes at least one correction unit, and three correction units 20.1, 20.2, 20.3 in the illustrated example, each being suitable for correcting signal errors of at least one of the scanning signals. Specifically, these correction units include an offset correction unit 20.1, an amplitude correction unit 20.2, and a phase correction unit 20.3.

Offset correction unit 20.1 is used for correcting a signal offset of incremental signals S0, S90 so that the minimum and the maximum values of the sinusoidal signals are disposed symmetrically about a reference potential (frequently ground potential 0V). Offset correction unit 20.1 may also be adapted to adjust an open-circuit potential of reference signal R, i.e., the potential that reference signal R exhibits as long as no reference pulse occurs.

Amplitude correction unit 20.2 is used for amplifying the signal amplitudes of the incremental signals to defined values, e.g., to a peak-to-peak value of 1V. Amplifier elements may be used for this purpose. Amplitude correction unit 20.2 may be arranged to adjust the amplitude of reference pulse R to a defined value.

Phase correction unit 20.3 is appropriately configured for adjusting the phase shift between the incremental signals, for instance to 90°, and the direction of movement (direction of rotation) determines which one of the signals is leading or is trailing. Phase correction unit 20.3 may furthermore be provided for adjusting the position of the reference pulse in relation to the incremental signals, for example, such that its maximum lies at a position at which the incremental signals have positive values and the same instantaneous value.

The scanning values corrected in this manner are output as positional signals P0, P90, PR via a signal interface 50 to subsequent electronics 80, such as a numerical control of a machine tool. Within the framework of the accuracy setting of correction units 20.1, 20.2, 20.3, positional signals P0, P90, PR correspond precisely to the ideal values of the interface specification. Signal interface 50 may include driver components, which amplify positional signals P0, P90, PR for the output to the subsequent electronics. The driver components may be suitably arranged for outputting positional signals P0, P90, PR both in the polarity generated by signal processing unit 20 and as inverted positional signals P180, P270, IPR.

A monitoring unit 30 is provided in signal processing unit 20. It is suitably configured to determine whether one of the signal errors of scanning signals S0, S90, R, corrected in correction units 20.1, 20.2, 20.3, reaches a limit value, or lies below or above a limit value. If this is the case, then monitoring unit 30 switches into a signaling mode and deactivates at least the particular correction unit 20.1, 20.2, 20.3 that corresponds to this signal error. In this exemplary embodiment, deactivating means that the corresponding correction unit 20.1, 20.2, 20.3 is switched into a basic state and thus no longer performs any correction. As a result, positional signals P0, P90, PR include at least the particular signal error that has led to the switch to the signaling mode. That is to say, if the amplitude of one of scanning signals S0, S90, R drops below a limit value, for example, then amplitude correction unit 20.2 will be deactivated, and if the offset of one of scanning signals S0, S90, R rises beyond a limit value, then offset correction unit 20.1 will be deactivated, etc.

The limit values may be selected such that subsequent electronics 80 is still able to evaluate positional signals P0, P90, PR, or in other words, the machine on which position measuring device 10 is operated remains operative.

Monitoring unit 30 may deactivates all correction units 20.1, 20.2, 20.3 in case of such an error, so that scanning signals S0, S90, R are output as positional signals P0, P90, PR. Switching devices 30.1, 30.2, 30.3 are provided for the deactivation of correction units 20.1, 20.2, 20.3.

On the side of subsequent electronics 80, a receiver-side monitoring unit 90 is provided, which monitors positional signals P0, P90, PR, detects the abrupt change in an error variable or a plurality of error variables caused by the switch-off of one or more correction unit(s) 20.1, 20.2, 20.3, and indicates this to an operator of the system, for example, by outputting a warning message on a monitor. As illustrated in FIG. 1, receiver-side monitoring unit 90 may be arranged within subsequent electronics 80 or it may instead be a separate device.

The configuration of a position measuring device 10 as described herein has two consequences that are relevant in practice. First of all, it makes it possible to signal to subsequent electronics 80 that a failure of position measuring device 10 has to be expected in the near future or that position measuring device 10 requires servicing in order to avert a failure. In this case, servicing may mean that measuring graduation 16, 17 and/or scanning unit 12 must be cleaned, or that the position of scanning unit 12 must be readjusted in relation to measuring graduation 16, 17. Secondly, the signaling mode may be utilized to actually allow an optimal adjustment of the position of scanning unit 12 in relation to measuring graduation 16, 17 during the initialization of position measuring device 10 in the first place, so that positional signals P0, P90, PR that are as precise as possible are obtained even without a correction. If correction units 20.1, 20.2, 20.3 were active at all times, then a rough positioning of scanning unit 12 in relation to the measuring graduation would already suffice to obtain usable positional signals P0, P90, PR. However, it may happen in this case that one or more of scanning signal(s) S0, S90, R just barely comply/complies with the prescribed limit values. Thus, an adjustment while correction units 20.1, 20.1, 20.3 are active is not practice-oriented.

The switchover into the signaling mode may be triggered artificially by damping or interrupting the signals used for the scanning. This may be achieved by moving scanning unit 12 away from measuring graduation 16, 17 during the initialization such that one or a plurality of limit value(s) of signal errors is/are reached, exceeded, or undershot. This is easily accomplished especially in the case of what are referred to as exposed linear encoders because in such a case the scale (graduation carrier 14) and scanning unit 12 are delivered and installed separately. Another option consists of introducing damping or interruption devices between scanning unit 12 and measuring graduation 16, 17. In optical scanning, for example, the optical path between a light source and corresponding photo-detectors may be interrupted by a foil, etc. In the case of magnetic scanning, a ferromagnetic material may be introduced between measuring graduation 16, 17 and the magnetic sensors, etc.

Deactivated correction units 20.1, 20.2, 20.3 may be able to be activated again only after position measuring device 10 has been switched off and on.

Figure 2:
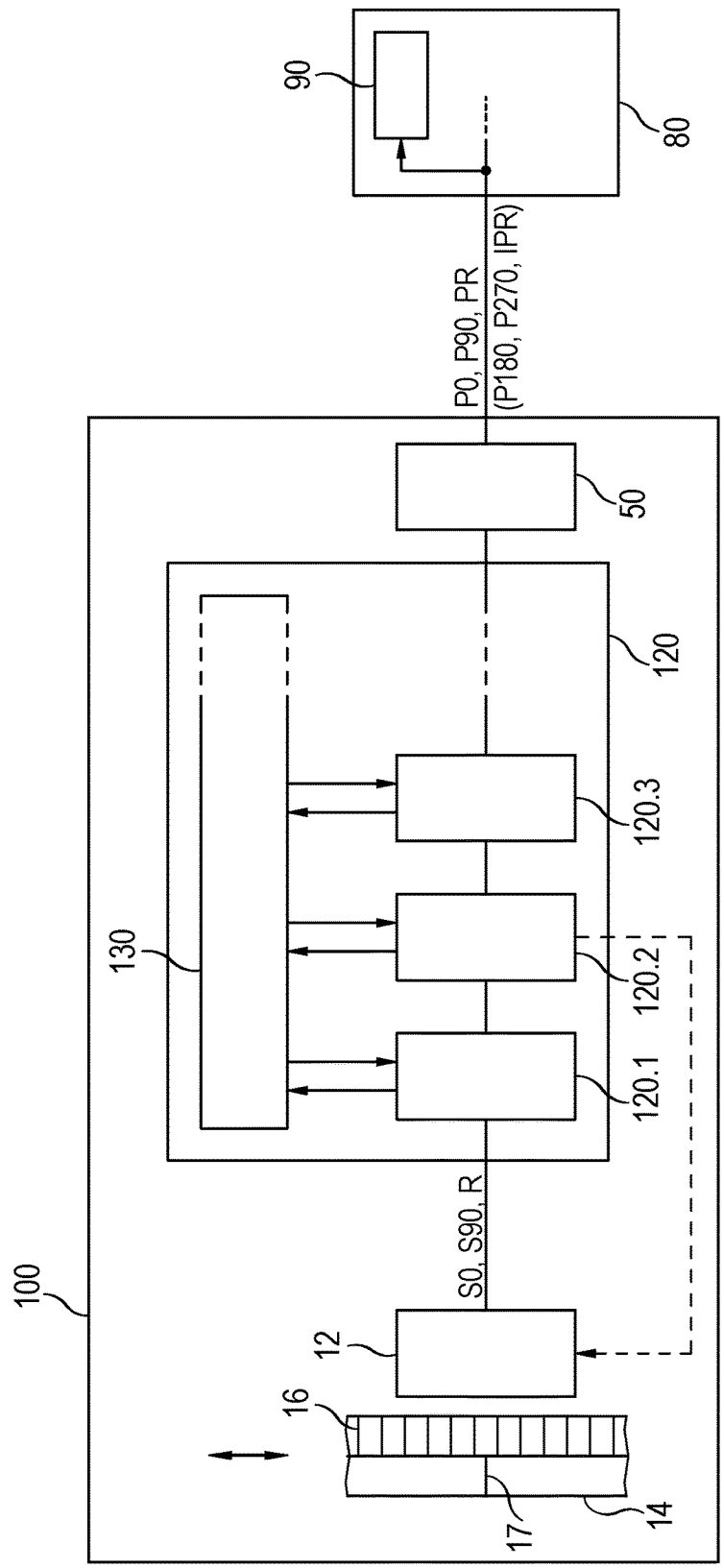
FIG. 2 schematically illustrates a position measuring device according to an example embodiment of the present invention.

FIG. 2 schematically illustrates a position measuring device 100 according to an example embodiment of the present invention. Components that were already described in connection with FIG. 1 have been provided with the same reference numerals.

In this example, too, a signal processing unit 120 includes an offset correction unit 120.1, an amplitude correction unit 120.2, and a phase correction unit 120.3. In a deviation from the previously described example, however, correction units 120.1, 120.2, 120.3 signal to monitoring unit 130 that a limit value has been reached, exceeded, or not attained. In such a case, monitoring unit 130 once again deactivates at least the particular correction unit 120.1, 120.2, 120.3 that corresponds to this signal error, or it also deactivates all correction units 120.1, 120.2, 120.3. However, the deactivation does not take place by turning off or bridging the respective correction unit 120.1, 120.2, 120.3 but by overriding the correcting function in that instantaneous control parameters are stored, so that the function of correction unit 120.1, 120.2, 120.3 is frozen so to speak. As a result, there will be no immediate change in positional signals P0, P90, PR in the transition into the signaling mode. Instead, a change becomes noticeable only in a further increase in the signal errors.

As indicated by the dashed arrow from amplitude correction unit 120.2 to scanning unit 12, a correction of signal errors may also be undertaken by acting on scanning unit 12 directly. When using an optical scanning principle, for example, the signal amplitude of scanning signals S0, S90, R may be enlarged by increasing the current for the operation of the light source. Even if scanning signals S0, S90, R are no longer present in physically measurable form in this case, signals are also described here that would be generated by scanning unit 12 without the influence of correction units 120.1, 120.2, 120.3. It should be appreciated that the foregoing also applies to the exemplary embodiment illustrated in FIG. 1 and described above.

Figure 3:
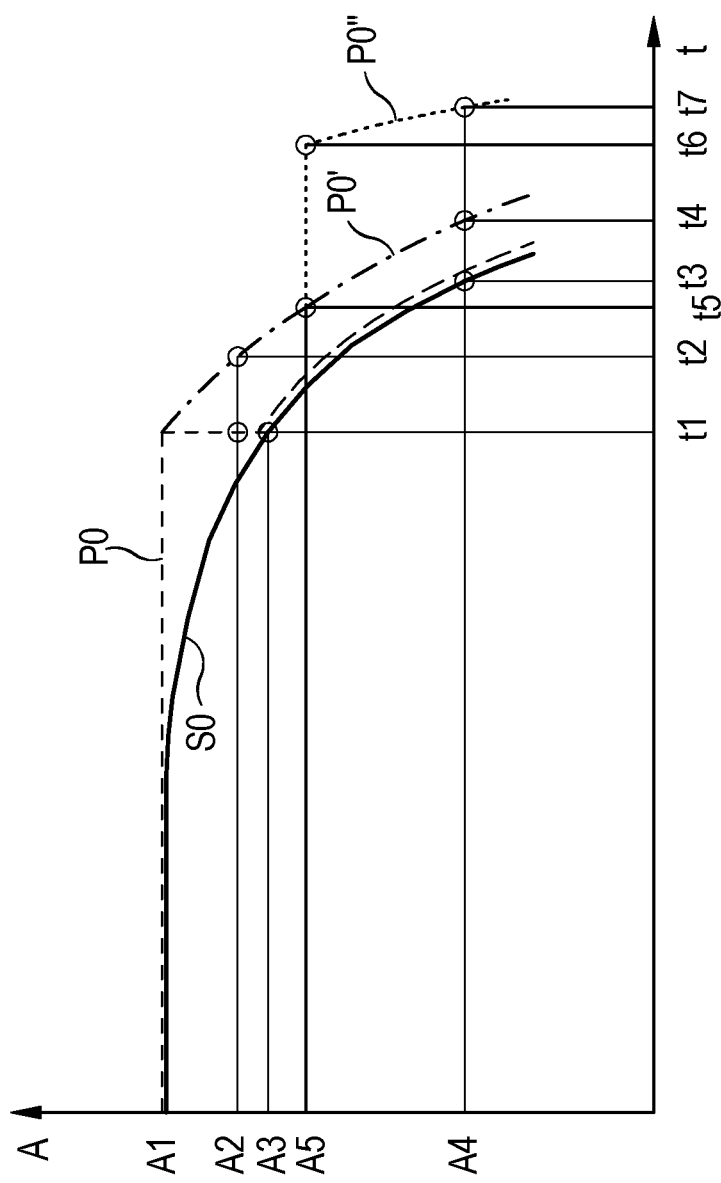
FIG. 3 schematically illustrates the signal characteristic of an amplitude value of an incremental scanning signal or a positional signal over time.

Using the example of the signal characteristic of amplitude value A of incremental scanning signal S0 or positional signal P0 over time, FIG. 3 illustrates advantages of the two exemplary embodiments described above with reference to FIGS. 1 and 2. The curve depicted by dashed lines represents positional signal P0 according to the exemplary embodiment illustrated in FIG. 1, and the dash-dot curve represents the alternative characteristic of positional signal P0' according to the example embodiment illustrated in FIG. 2. Depending on the operating conditions of position measuring device 10, 100, the illustrated curves may cover a time span of many years.

After the initialization of position measuring device 10, 100, scanning signal S0 (and also positional signal P0) has a starting amplitude A1. The amplitude lessens over the course of the service life of position measuring device 10, 100, in particular in the case of an optical scanning principle, inasmuch as the luminous power of the light source worsens or the contamination of the measuring graduation increases continuously.

Limit value A2 is the particular amplitude value at which receiver-side monitoring unit 90 detects a reduction in the amplitude on the part of subsequent electronics 80 and generates a warning signal.

Limit value A3 is the particular amplitude value that when reached or undershot, causes monitoring unit 30 to switch position measuring device 10, 100 into the signaling mode.

Limit value A4 is finally the smallest amplitude value that is still able to be evaluated by subsequent electronics 80. A drop below limit value A4 leads to a failure of the system in which position measuring device 10, 100 is operated.

At an instant t1, scanning signal S0 reaches limit value A3, and position measuring device 10, 100 switches into the signaling mode and deactivates amplitude correction unit 20.2 or 120.2. In position measuring device 10, which is arranged according to the exemplary embodiment illustrated in FIG. 1, this leads to an abrupt reduction of positional signal P0, which is immediately detected because of the undershooting of limit value A2 on the part of subsequent electronics 80. However, position measuring device 10 may still continue to be operated until instant t3 so that sufficient time remains for servicing or exchanging position measuring device 10 in the course of a normal service interval.

In contrast, in position measuring device 100 according to the exemplary embodiment illustrated in FIG. 2, starting at the switchover instant, positional signal P0' substantially follows the characteristic of scanning signal S0 and reaches limit value A2 only at an instant t2. Here, too, sufficient time remains for servicing or exchanging position measuring device 100 until position measuring device 100 fails at instant t4. Because the reduction of the amplitude of scanning signals S0 frequently accelerates towards the end of the service life, the time span between instants t2 and t4 is shorter than the time span between instants t1 and t3 of the first exemplary embodiment. On the other hand, the end of the service life of position measuring device 10 of the first exemplary embodiment at instant t3 is reached earlier than the end of the service life of position measuring device 100 of the second exemplary embodiment.

In contrast, if correction unit 20.1, 20.2, 20.3, 120.1, 120.2, 120.3 were to be operated until it reaches its control limit, then the time between the detection of an impending breakdown and the reaching of the end of the service life of position measuring device 10, 100 would shorten to such an extent that a reaction in the form of service or an exchange within a standard service interval would no longer be possible.

A further improvement in position measuring device 100 is able to be achieved if in the example embodiment illustrated in FIG. 2, monitoring unit 130 is also appropriately configured to reactivate at least the particular correction unit that is triggering the event (in the example of FIG. 3, amplitude correction unit 120.2) once a second limit value A5 has been reached (at instant t5), i.e., using a setpoint value of the control that represents a poorer signal quality of positional signals P0, P90, PR. In the example illustrated, the setpoint value of the control is set to second limit value A5, thereby resulting in the alternative amplitude characteristic of positional signal P0", which is shown in the form of the dotted line. This makes it possible to maintain the amplitude of positional signal P0" at the level of second limit value A5 until the control limit is reached at instant t6. After this instant, the amplitude of positional signal P0" diminishes rapidly and reaches limit value A4 for the safe operation of the system at instant t7.

Similarly, the reaching of second limit value A5 may also be obtained by monitoring scanning signal S0. In the same manner, this method may be used in a form that is adapted to other signal errors and may also be reproduced for the first exemplary embodiment.

This procedure leads both to a longer achievable service life of position measuring device 100 and to increased reliability in the evaluation of positional signal P0" in subsequent electronics 80 because the risk of a processing error in subsequent electronics 80 increases the closer the amplitude of positional signal P0" comes to functional limit A4.

This procedure is particularly suitable for optical scanning principles in which, as previously mentioned, the increase in the signal amplitude of positional signals P0, P90, PR by amplitude correction unit 120.2 may take place both by amplifying scanning signals S0, S90, R using amplifier elements, and also by increasing the operating current of the light source employed. Since the increase in the operating current of a light source often has a negative effect on its service life, the correction of the signal amplitude until first limit value A3 is reached may predominantly be provided by regulating the current of the light source, and once second limit value A5 has been reached, predominantly by an amplification with the aid of amplifier elements.

Signal processing unit 20, 120 may at least partially be provided in the form of a programmable component (FPGA) or an application-specific integrated circuit (ASIC). In the same manner, functions of signal processing unit 20, 120 may be provided, either fully or partially, through the use of a microprocessor, in particular a signal processor. In addition to the described functions, signal processing unit 20, 120 may also carry out processing steps.

What is claimed is:

1. A position measuring device, comprising:
   a graduation carrier including a measuring graduation;
   a scanning unit, the graduation carrier and the scanning unit being movable in a measuring direction relative to each other, the scanning unit adapted to generate position-dependent scanning signals by scanning the measuring graduation;
   a signal processing unit adapted to process the scanning signals into positional signals;
   a signal interface adapted to output the positional signals to subsequent electronics;
   at least one correction unit provided in the signal processing unit adapted to correct at least one signal error of at least one scanning signal; and
   a monitoring unit adapted to detect the signal error reaching a first limit value and to subsequently deactivate a corresponding correction unit.

2. The position measuring device according to claim 1, wherein the monitoring unit is adapted to deactivate the corresponding correction unit by switching off the corresponding correction unit, so that the scanning signal is output as the positional signal.

3. The position measuring device according to claim 1, wherein the monitoring unit is adapted to deactivate the correction unit by overriding a correction function and storing instantaneous control parameters.

4. The position measuring device according to claim 1, wherein the correction unit includes an offset correction unit, an amplitude correction unit, and/or a phase correction unit.

5. The position measuring device according to claim 1, wherein the monitoring unit is adapted to reactivate at least the corresponding correction unit when a second limit value has been reached, to maintain an amplitude of the positional signal at a setpoint.

6. A method for operating a position measuring device, including a graduation carrier, having a measuring graduation, and including a scanning unit, the graduation carrier and the scanning unit being movable in a measuring direction relative to each other, comprising:
   generating position-dependent scanning signals by the scanning unit scanning the measuring graduation;
   processing, in a signal processing unit, the scanning signals into positional signals;
   outputting the positional signals to subsequent electronics by a signal interface;
   correcting at least one signal error of at least one scanning signal by at least one correction unit provided in the signal processing unit;
   determining, by a monitoring unit, whether a limit value of the signal error is reached; and
   subsequent to the determining, deactivating, by the monitoring unit, the correction unit corresponding to the signal error that reaches the limit value.

7. The method according to claim 6, wherein the monitoring unit deactivates the correction unit by switching off the correction unit, so that the scanning signal is output as the positional signal.

8. The method according to claim 6, wherein the monitoring unit deactivates the correction unit by overriding a correction function and by storing instantaneous control parameters.

9. The method according to claim 6, further comprising reactivating the deactivated correction unit by switching the position measuring device off and on.

10. The method according to claim 6, wherein when a second limit value is reached, the monitoring unit reactivates the deactivating correction unit, to maintain an amplitude of the positional signal at a setpoint.

11. A signal transmission system, comprising:
the position measuring device recited in claim 1;
subsequent electronics connected to the position measuring device; and
a receiver-side monitoring unit connected to the subsequent electronics adapted to detect at least one positional signal reaching a limit value.

* * * * *